Feb. 27, 1973 W. SOULE, JR., ET AL 3,718,911

CARRIAGE-POSITION MODIFICATION OF EXTERNAL PROGRAM

Original Filed Feb. 23, 1965 6 Sheets-Sheet 3

United States Patent Office 3,718,911
Patented Feb. 27, 1973

3,718,911
CARRIAGE-POSITION MODIFICATION OF EXTERNAL PROGRAM

Winsor Soule, Jr., Berkeley, and John Efstathiou, Oakland, Calif., assignors to SCM Corporation, New York, N.Y.

Original application Feb. 23, 1965, Ser. No. 434,265, now Patent No. 3,522,416. Divided and this application Mar. 24, 1970, Ser. No. 24,906
Int. Cl. G06f *9/04, 15/00*
U.S. Cl. 340—172.5 9 Claims

ABSTRACT OF THE DISCLOSURE

Controls for positioning data entry and for clearing instructions and data in an externally programmed computer, particularly applicable to one having a typewriter as an input-output unit and a record reader as the program source. The novel controls provide interaction between the typewriter carriage and keyboard and the program in the reader.

Figure 12C:
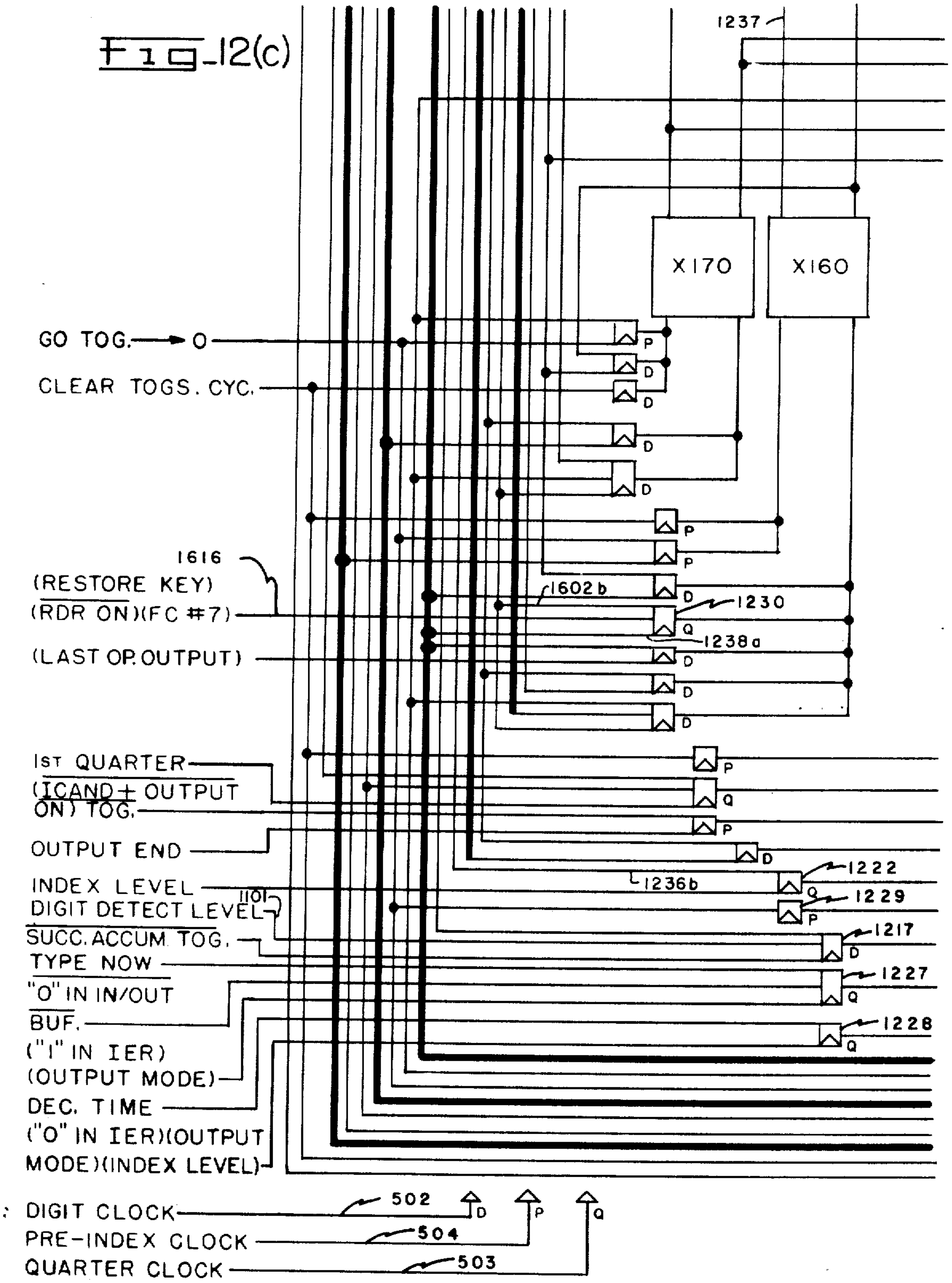

This is a division of application Ser. No. 434,265, now Pat. No. 5,522,416, filed Feb. 23, 1965, by Winsor Soule, Jr. et al. and entitled "Input-Output Controls."

The particular invention claimed herein relates to controls for electronic digital computers, particularly those of the externally programmed type in which operating instructions and data are stored in record media such as punched paper tape.

The essential novelty of the invention claimed herein is that the position (or positioning) of the carriage of a typewriter present as the input-output unit for a computer provides additional control, particularly where the computer is externally programmed, the instructions being recorded, for example, on the punched paper tape, and being variable-length series of coded characters (words) presented serially in character-by-character fashion, each character representing an instruction defining an operation—including those of an algebraic nature, an address, or an output format selection.

As disclosed in the parent patent, instruction words can be interrupted and data to which other elements of the system respond can be interspersed within the instruction word and yet not affect the subsequent execution of the computer operation defined by the computer instruction characters. Additionally, these instruction characters can include those to which the computer would normally respond, but according to the disclosure in the parent patent, can be used for control of other elements of the system without affecting execution of the sequence defined by the computer instruction characters proper. According to that disclosure, further, the numeric data received within a computer entry instruction sequence has different significance according to the order in which the numerics are received, the first digit received within the instruction sequence is not treated as the most significant digit, but, instead defines the position at which the most significant digit of the succeeding numerics will be stored in a memory device.

SUMMARY OF THE INVENTION

As one feature of the invention claimed herein, in this externally-programmed computer, sensing of a Space or Backspace code in the record media (or generated upon depression of a related typewriter key) during an entry operation which causes a shift of the printing position (carriage shift) and also causes a succeeding digit to enter storage at an ordinal position differing from a previously selected position by a value of one. This is necessary for audit trail purposes because otherwise a number entry in a document could be correct, but the order entry information not having been changed correspondingly the number in storage would be incorrectly located.

Yet another feature of the invention claimed herein is that a "Field Control," a control sensitive to carriage position, is used to condition the response of the computer to operation of a "Restore" key, such that this key is effective only at pre-programmed positions of the cirriage of the Writing Machine used for input and output of data.

The drawings and description of the Parent Pat. 3,522,416 are incorporated by reference. The essential material therein which applies to the first feature includes at least FIGS. 11*a*, *b*, 13, and 17*a*, *b*, together with the general description of input, col. 13, line 57 through col. 18, line 55, and the specific discussion of the effect of operating a space key or backspace key during the input sequence, from line 65 of col. 15 to line 38 of col. 16. As to the second feature, essential material in Pat. 3,522,416 applicable to that feature includes FIGS. 4, 12*c*, 15*a*–15*d*, 16 and 23 together with the general description of input, col. 13, line 57 through col. 18, line 55, and the particular discussion of the interaction of the Restore Key and the Field Control, given in col. 31, beginning with line 5, and continuing through line 52 of col. 32.

BRIEF DESCRIPTION OF THE APPENDED DRAWING

Figure 13:
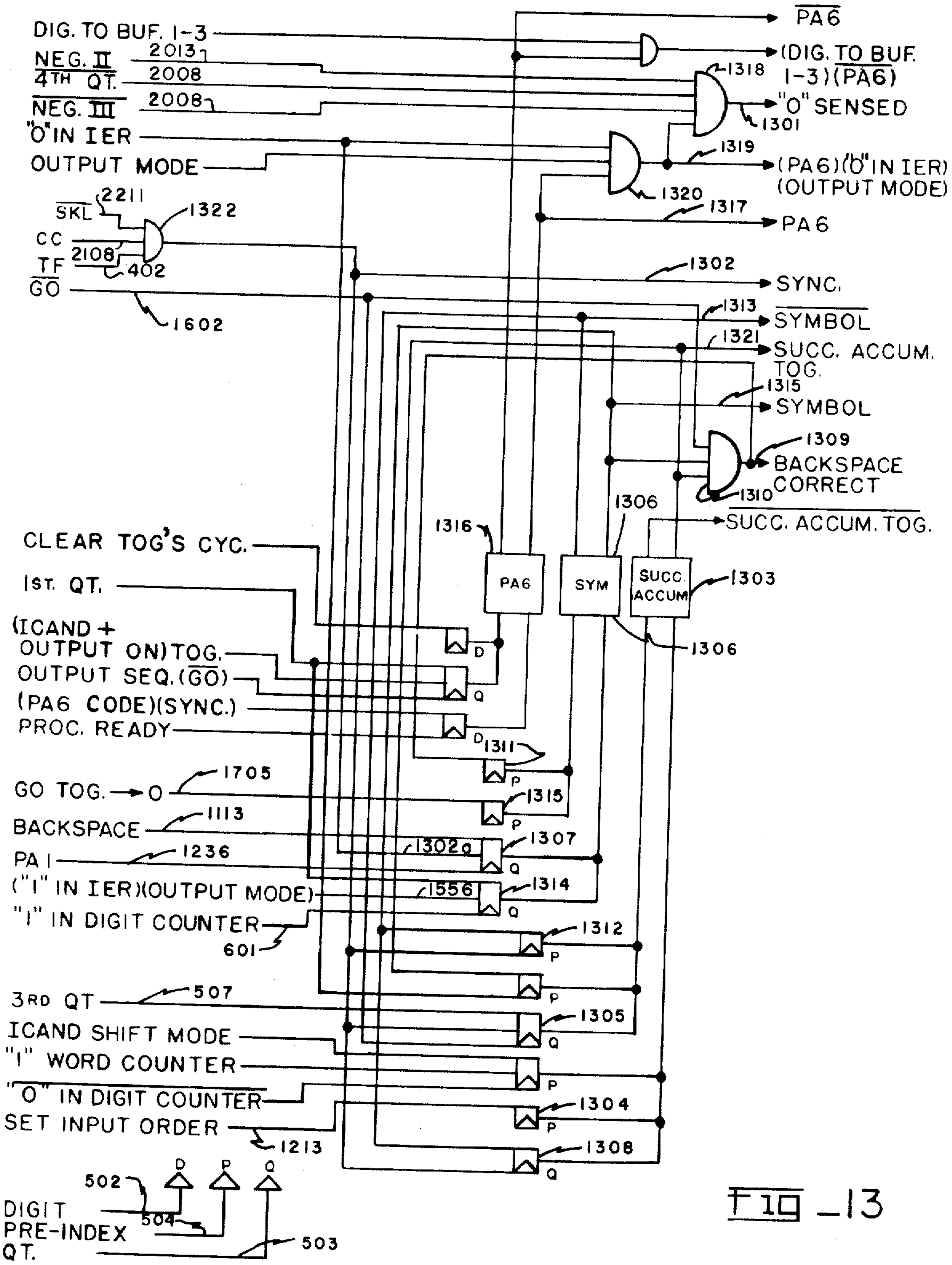
Figure 16:
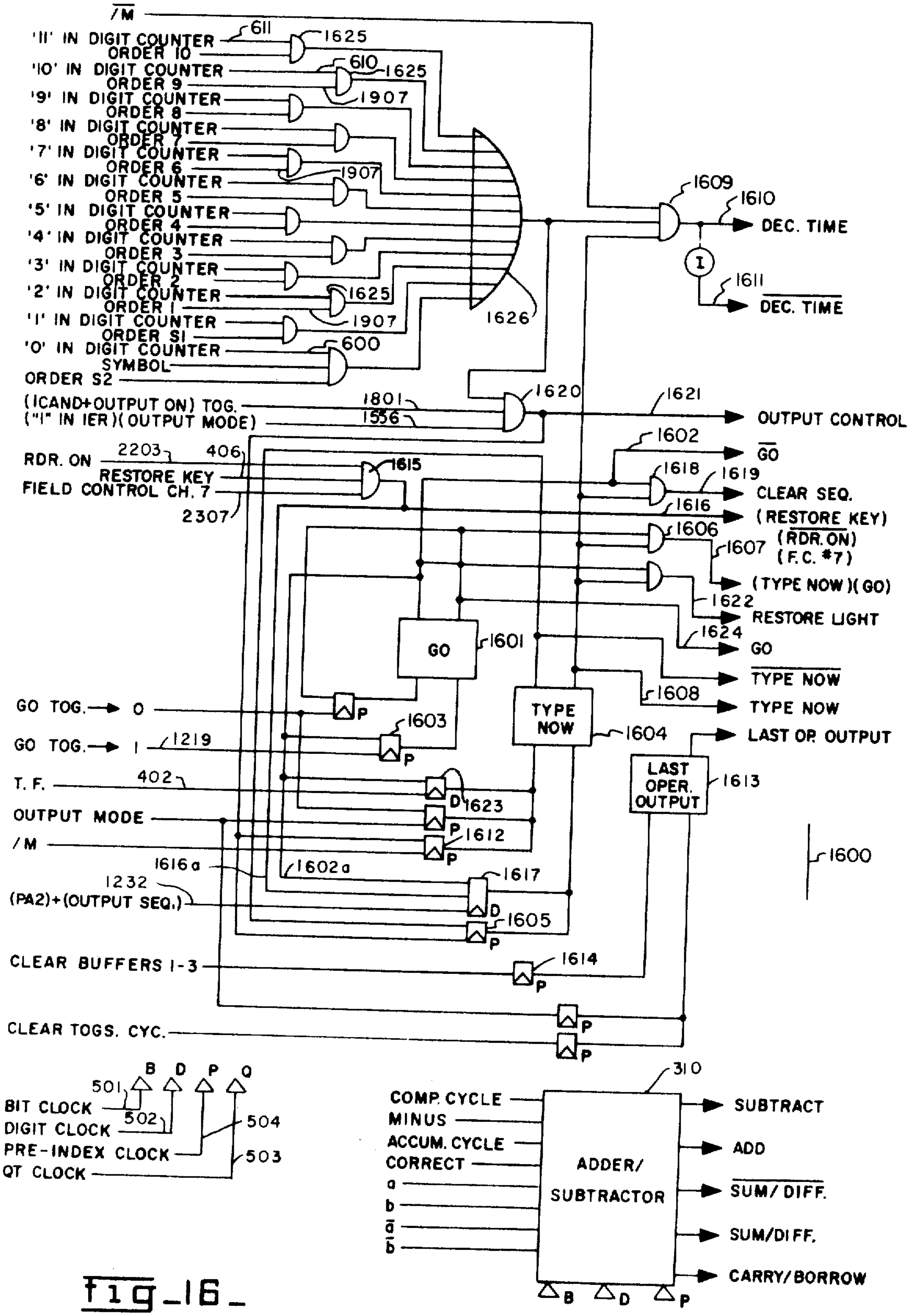
Figure 17:
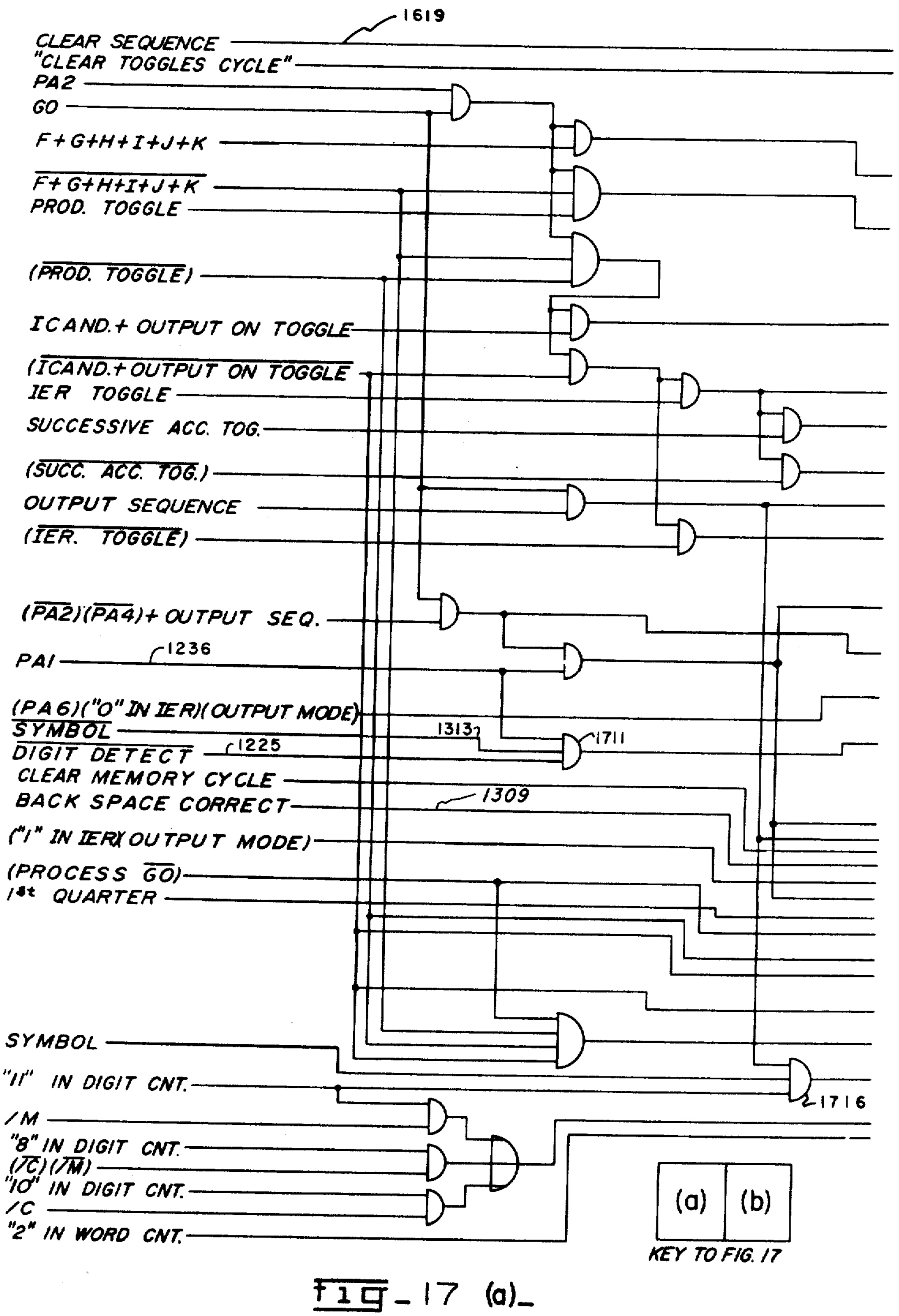
Figure 17:
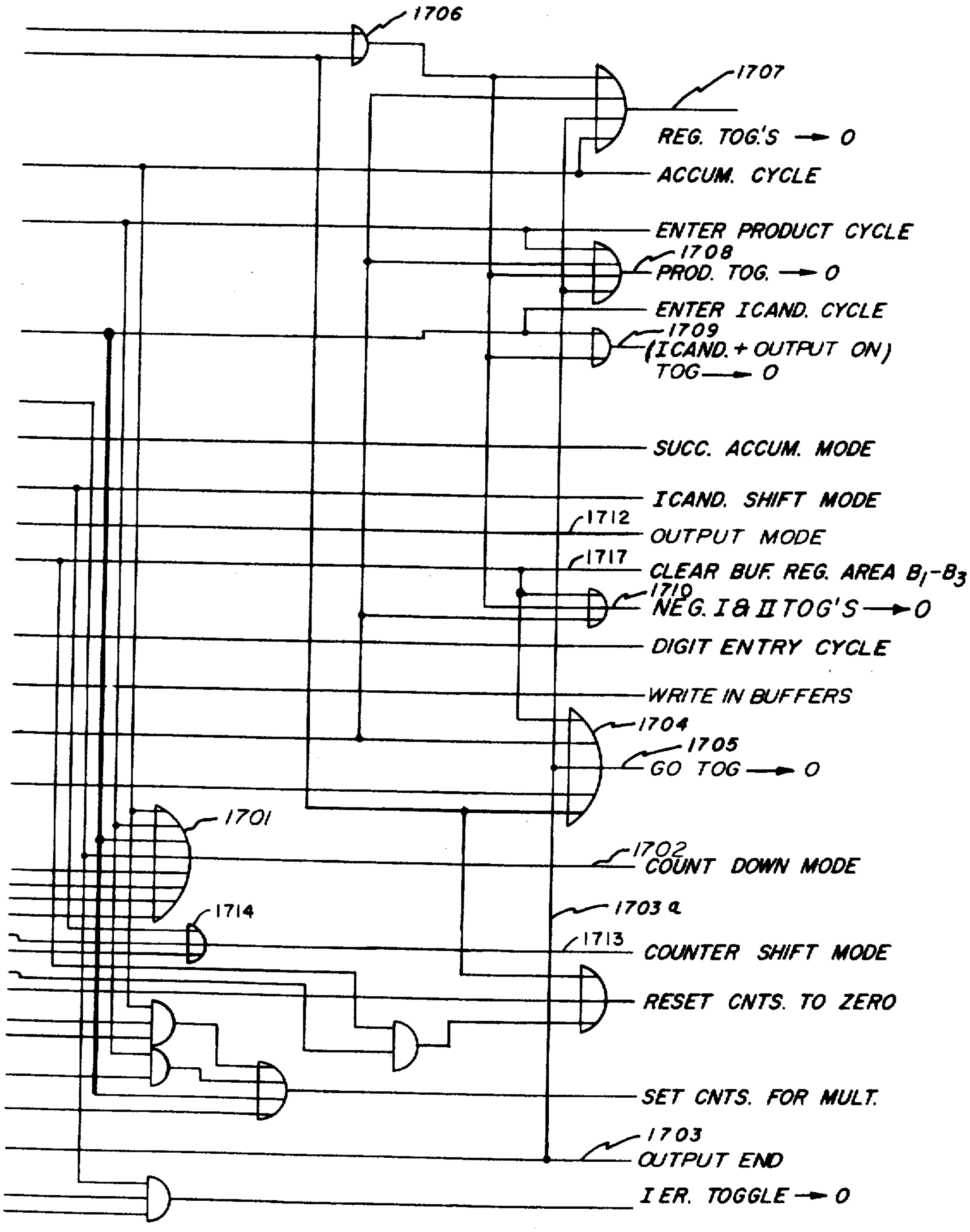
Figure 23:
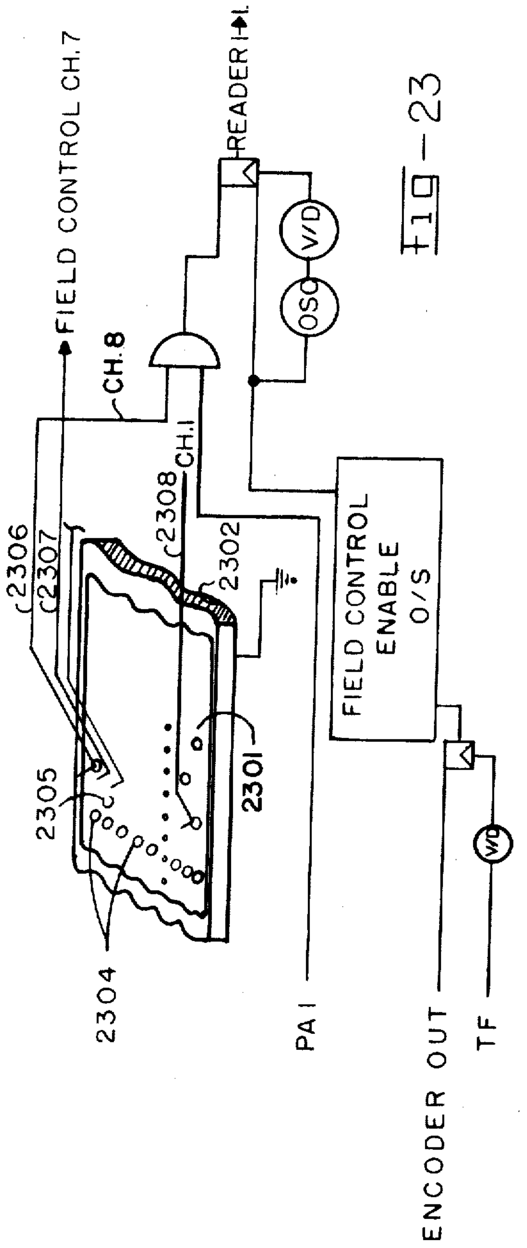

FIG. 12*c*—a logic diagram showing part of the toggles which define the operation to be controlled when an execute command is subsequently received, together with the output signals, including field control signals, generated to control these operations;

FIG. 13—a logic diagram of the remaining control toggles which determine the sequence to be followed;

FIG. 16—a logic diagram of the toggles that control the input-output sequencing and a block diagram of the arithmetic unit—the adder/subtractor—with the inputs it requires and the outputs it generates;

FIGS. 17*a*–17*b*, arranged as shown in FIG. 17*a*—a logic diagram showing combinations of various signals to produce others of the Processor sequence control signals; and FIG. 23—a combined semi-pictorial and logic diagram showing the Field Control for controlling various functions according to the Writing Machine carriage position.

We claim:

1. In a data processing system having digit entry means, a register having a plurality of orders for digit storage, means for shiftably printing the digits on a document, an external program device comprising a discrete record reader for sensing program instructions contained in record media, and address means specifying the register order in which the next digit entry will be stored, the combination of means responsive to a particular instruction and producing a command indicative of a shift, said command being ineffective with respect to the reader, but effective with respect to said printing of the digits; and means for obtaining a change of one unit in the order indicated by said address means in response to production of said shift command.

2. A data processing system as defined in claim 1, wherein said means for producing said shift command are alternatively responsive to operation of a particular key on said keyboard.

3. A data processing system as defined in claim 2, wherein said particular key is a backspace key, and further including a carriage movable to a plurality of positions, together with means for backspacing said carriage to a preceding one of said positions, said backspacing means being responsive to production of said shift command.

4. A data processing system as defined in claim 3, wherein said instructions include information as to an initial order for entry in said register, and said address means is set to an initial value in response to the reading of said initial order information.

5. A data processing system as defined in claim 4, wherein said address means comprises a counter.

6. A data processing system as defined in claim 1, further including a second register having a plurality of orders for digit storage, wherein said program instruction contains information as to selection of one of said registers and as to an initial order for entry in said selected register, and said address means is set to an initial value in response to the reading of said initial order information.

7. A data processing system as defined in claim 6 wherein said address means comprises a counter.

8. In a data processing system comprising print-out means including a carriage movable to a plurality of positions; an externally programmed computer capable of receiving, in serial fashion, data and program instructions from a plurality of sources including a keyboard, the program instructions comprising a command identifying one of a plurality of operations, said operation-identifying command being followed by other commands specifying address and format; the combination of:

- a field control responsive to the position of said carriage, comprising means for producing a particular signal at one position;
- a switch operable by manual means;
- a plurality of bi-stable control elements, said bi-stable control elements each changing from a first to a second state in response to receipt of a related one of said commands; and
- means responsive to operation of said switch for resetting all said bi-stable elements to said first state except for the bi-stable element responsive to the operation-identifying command, said resetting means being responsive to said switch only when said particular signal is present.

9. A data processing system as defined in claim 8, wherein at least one of said operations defines a data entry through said keyboard, and said particular signal is a field control signal, and further including

- at least one plural-order register;
- counter means for identifying the various orders of said register;
- means for setting said counter to an initial count in response to receipt of one of said address-specifying commands;
- means for changing the count in said counter in response to data entry through said keyboard; and
- means for resetting said counter to said initial count in response to operation of said switch when said field control signal is present.

References Cited

UNITED STATES PATENTS

| | | | |
|---|---|---|---|
| 3,348,215 | 10/1967 | Soule et al. | 340—172.5 |
| 3,291,277 | 12/1966 | Borrelli et al. | 197—20 |
| 3,380,569 | 4/1968 | Becking et al. | 197—20 |
| 3,358,804 | 12/1967 | Feldman | 197—20 |
| 3,060,272 | 10/1962 | Bacon et al. | 197—19 |

PAUL J. HENON, Primary Examiner
R. F. CHAPURAN, Assistant Examiner